(12) United States Patent
Schmidt et al.

(10) Patent No.: US 10,464,522 B2
(45) Date of Patent: Nov. 5, 2019

(54) RETRACTOR WITH MUD SHIELD AND VIBRATION REDUCTION

(71) Applicant: Key Safety Systems, Inc., Sterling Heights, MI (US)

(72) Inventors: Brian Schmidt, Macomb, MI (US); John Pollard, Imlay City, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 278 days.

(21) Appl. No.: 15/509,621

(22) PCT Filed: Sep. 8, 2015

(86) PCT No.: PCT/US2015/048910
§ 371 (c)(1),
(2) Date: Mar. 8, 2017

(87) PCT Pub. No.: WO2016/040303
PCT Pub. Date: Mar. 17, 2016

(65) Prior Publication Data
US 2017/0291570 A1     Oct. 12, 2017

Related U.S. Application Data

(60) Provisional application No. 62/047,699, filed on Sep. 9, 2014.

(51) Int. Cl.
*B60R 22/41* (2006.01)
*B60R 22/40* (2006.01)
*B60R 22/34* (2006.01)

(52) U.S. Cl.
CPC ............ *B60R 22/41* (2013.01); *B60R 22/40* (2013.01); *B60R 2022/3402* (2013.01); *B60R 2022/401* (2013.01)

(58) Field of Classification Search
CPC .... B60R 22/40; B60R 22/41; B60R 2022/401
See application file for complete search history.

(56) References Cited

U.S. PATENT DOCUMENTS

| 4,103,842 A * | 8/1978 | Martin ................. B60R 22/343 188/139 |
| 4,238,087 A | 9/1980 | Makishima |
| 2005/0067520 A1 * | 3/2005 | Webber .................. B60R 22/40 242/384.4 |

(Continued)

FOREIGN PATENT DOCUMENTS

| EP | 0477918 A1 | 4/1992 |
| FR | 2280903 A1 | 2/1976 |
| GB | 2242347 A | 10/1991 |

*Primary Examiner* — Sang K Kim
(74) *Attorney, Agent, or Firm* — David L. King (57) ABSTRACT

A seat belt retractor (10) having a frame with sides (14, 16) and a cover associated with at least one side, an inertial sensor (30) positioned between the at least one side of the frame and the cover, a seal located between the cover and the frame side to prevent contaminants from entering a space about the inertial sensor, the inertia sensor including a movable mass (34) and a magnet (36) spaced from the mass (34) to create a magnetic force upon the mass (34) preventing the magnet from moving excessively if the retractor is subject to predetermined levels of vibration.

18 Claims, 7 Drawing Sheets

(56) References Cited

U.S. PATENT DOCUMENTS

2006/0180695 A1* 8/2006 Morgan ............ B29C 45/14065
242/384.4
2013/0256443 A1 10/2013 Elizondo

* cited by examiner

Fig - 6

RETRACTOR WITH MUD SHIELD AND VIBRATION REDUCTION

BACKGROUND AND SUMMARY OF THE INVENTION

The present invention relates in general to seat belt retractors and more particularly to a seat belt retractor capable of operating in severe environments such as mud and snow and rain. More particularly, the present invention provides a sealed chamber for the vehicle inertia sensor, also referred to as a vehicle sensor, which is used to initiate lock-up of the retractor.

More specifically the invention comprises: a seat belt retractor 10 having a frame with sides 14, 16 and a cover associated with at least one side, an inertial sensor positioned between the at least one side of the frame and the cover, a seal located between the cover and the frame side to prevent contaminants from entering a space about the inertial sensor, the inertia sensor including a movable mass 34 and a magnet 36 spaced from the mass 34 to create a magnetic force upon the mass 34 preventing the magnet from moving excessively if the retractor is subject to predetermined levels of vibration.

DETAILED DESCRIPTION OF THE DRAWINGS

Figure 1:
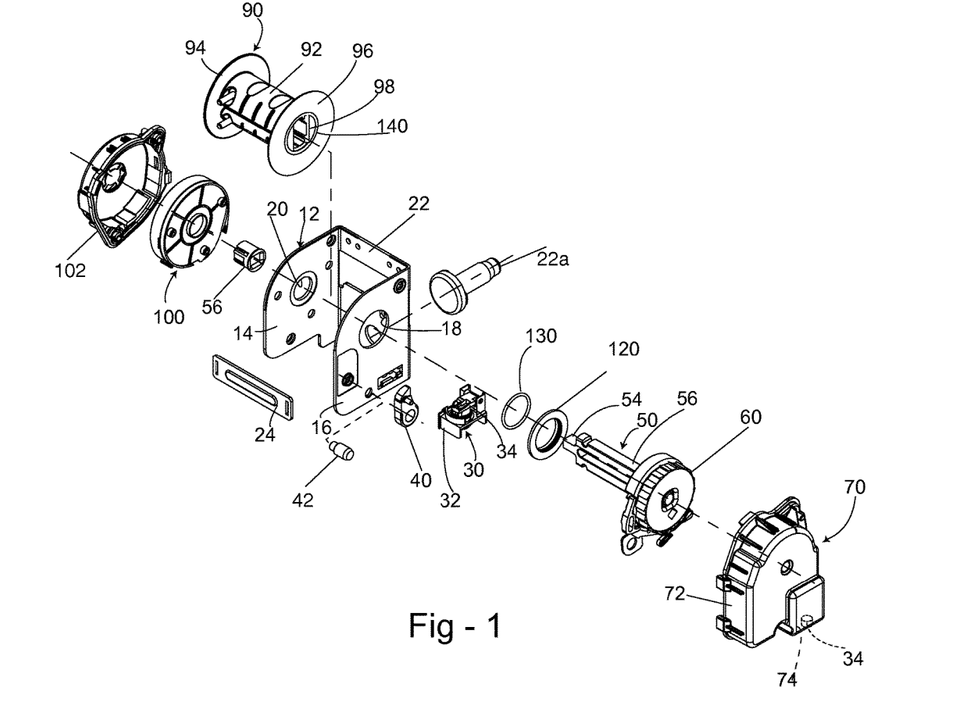
FIG. 1 is an exploded view showing the present invention incorporated within a prior art retractor.
Figure 2:
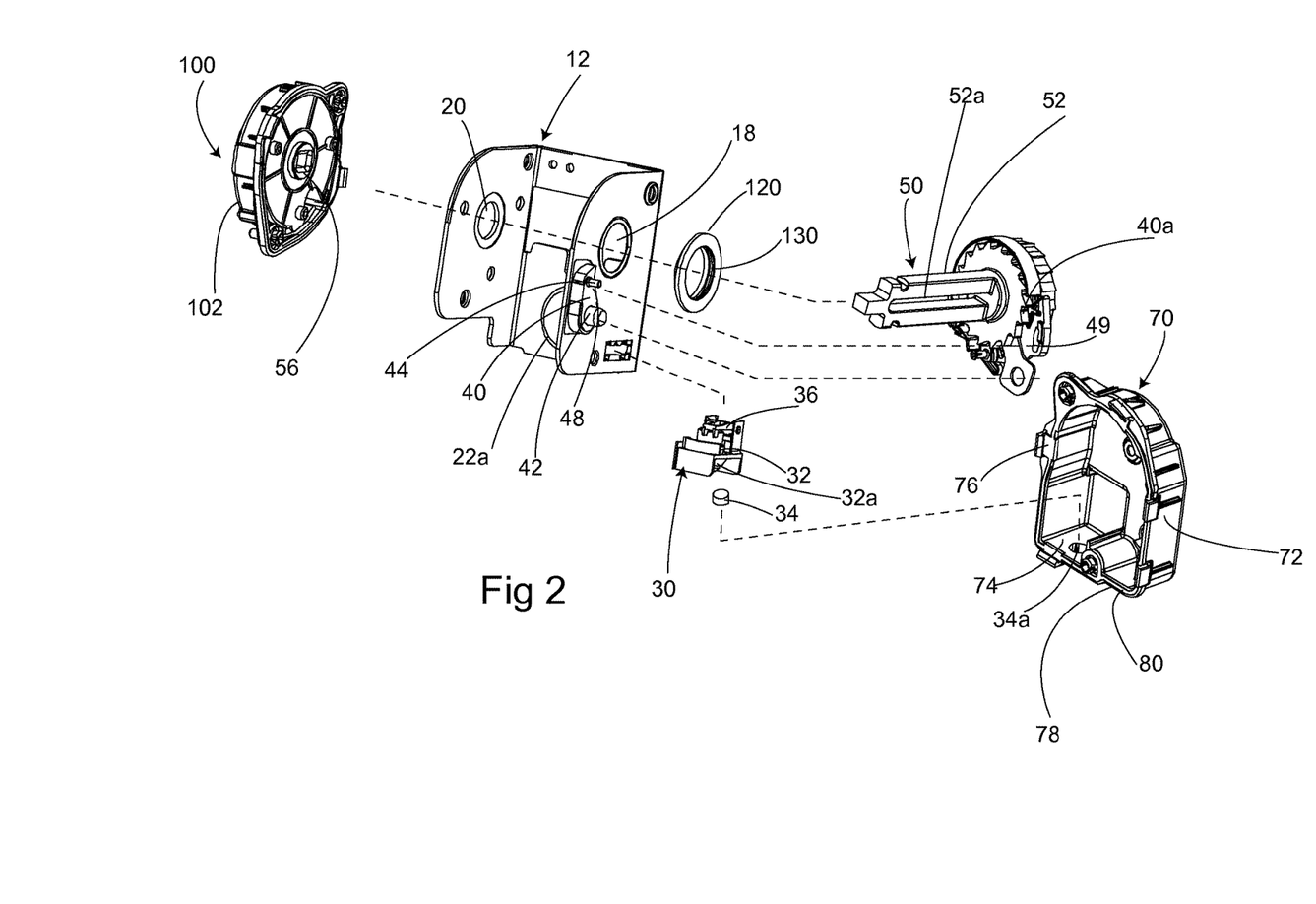
FIG. 2 is a partial exploded view showing a spring cover and mechanism cover moved away from the other retractor components.
Figure 3:
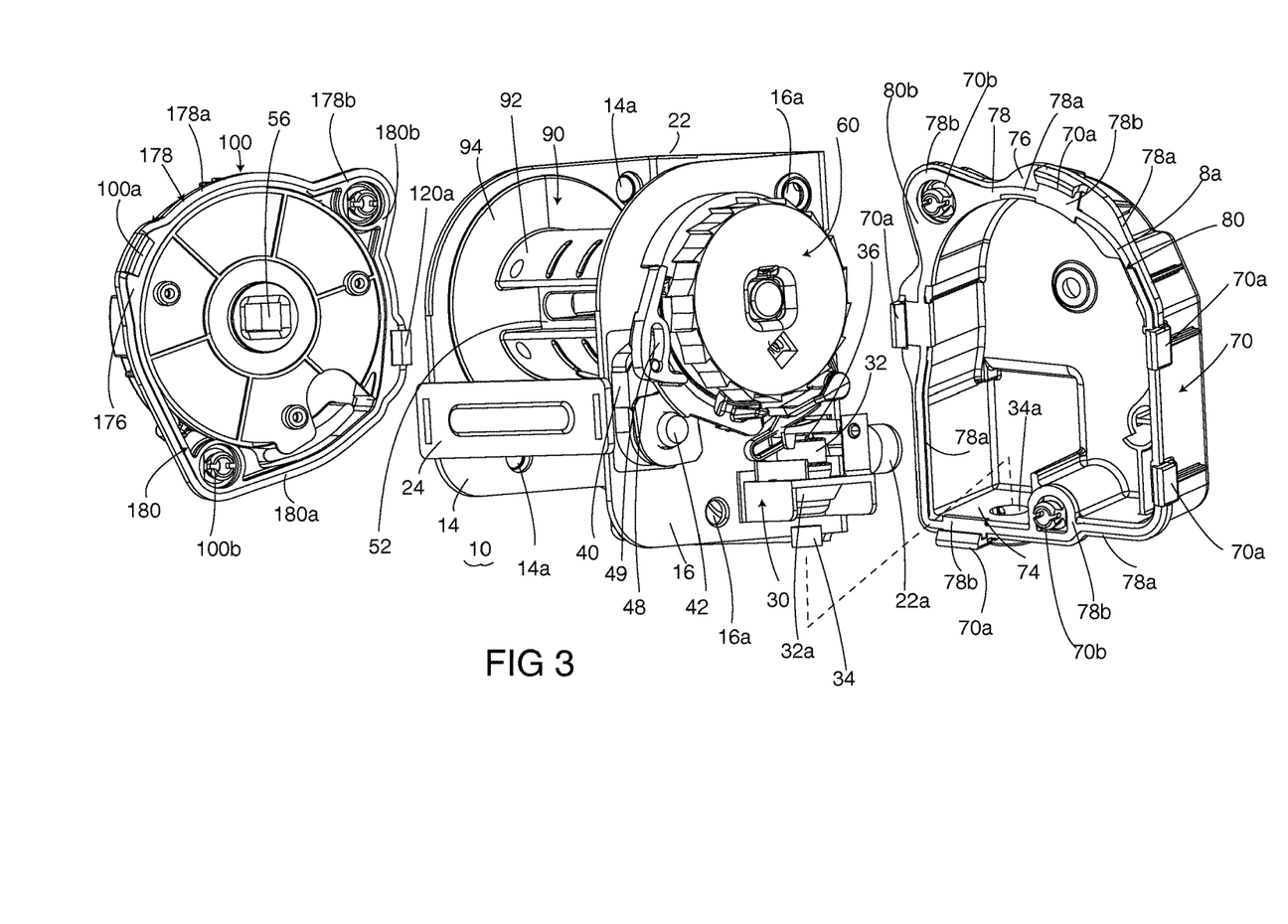
FIG. 3 is yet another exploded view of the invention.

Reference is made to FIGS. 1, 2 and 3 each of which show exploded views of the present invention. The exploded views show features of the present invention incorporated into a known seat belt retractor. Retractor 10 includes frame 12 having sidewalls 14 and 16. Sidewall 16 includes an opening 18 while sidewall 14 includes opening 20. Frame 12 includes a rear portion 22 through which a fastener 22a can extend. A tie bar 24 is used to prevent sides 14 and 16 from moving apart from their desired generally perpendicular orientation relative to the rear portion 22. Secured to side 16 is a vehicle inertia sensor 30 which has a housing 32, a movable mass 34 and a sensor pawl 36 which is moved from a rest position to an actuated position by the mass. The sensor pawl 36 can comprise a single pawl or a more complex mechanism comprising multiple pawls. Housing 32 includes a concave portion 32a in which the mass 32 is located. As discussed below the movable mass is preferably a standing man sensor of known construction. The vehicle sensor 30 is part of the locking mechanism of retractor 10. The locking mechanism additionally includes a locking pawl 40 which pivots about pin 42. Pin 42 is received within a small opening 44 in frame side 16. Pawl 40 includes a control pin 48 that is received within a slot 49 in the shaft-lock wheel and ratchet assembly 50.

One of the aspects of the present invention is to improve the performance of a seat belt retractor over rough, muddy and snow laden roads and trails. As one can imagine when a vehicle equipped with retractor 10 operates over rough roads and trails the vehicle, retractor will bounce. This bouncing will cause mass 32 to bounce and if not compensated will cause the inertia sensor to initiate premature lock-up of the retractor 10. Typically a retractor is designed to lock up when experiencing a high level of forward deceleration and not when the vehicle is bouncing about. Another aspect of the present invention is to prevent contaminants from entering the various mechanisms of the retractor and detract them from working properly.

Figure 4:
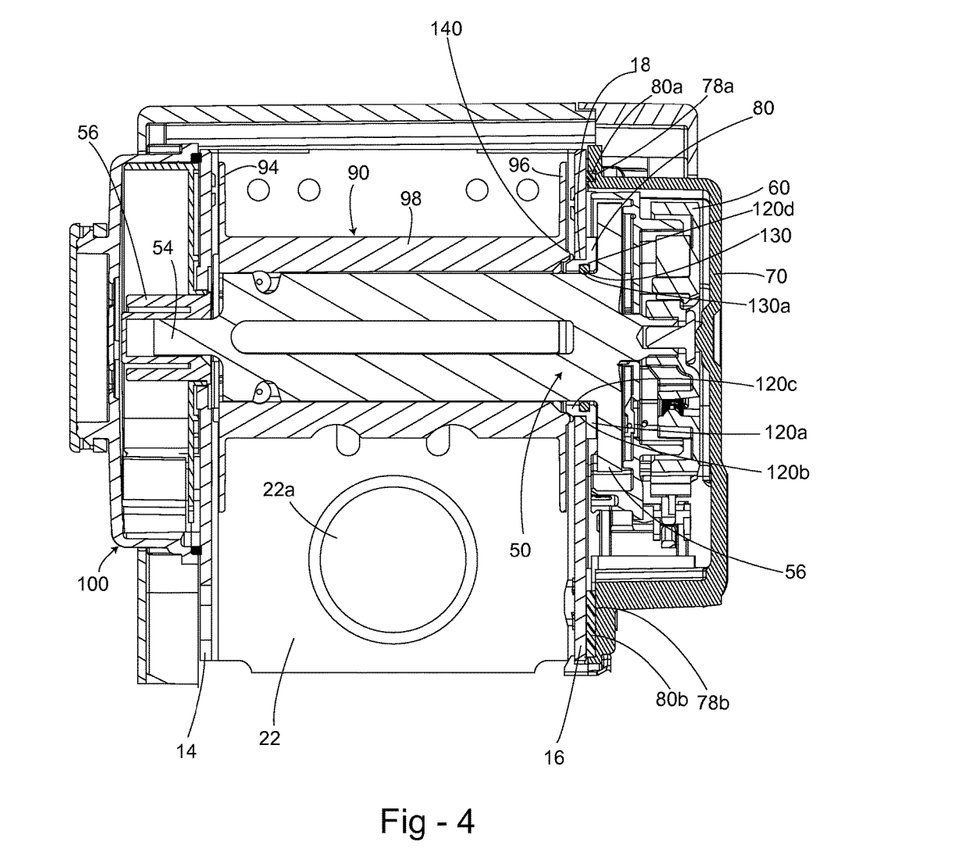
FIG. 4 is a cross-sectional view.

The locking mechanism additionally includes the shaft-lock wheel and ratchet assembly 50. The assembly 50 includes a shaft 52 which terminates in an end 54 which is received within a spring arbor 56. One end of a length of seat belt, not shown, is slipped through slot 52a of shaft 52 and secured to the shaft in a known manner. The assembly 50 also includes ratchet wheel 60 of known construction. During instances of high vehicle deceleration, the lock wheel 60 will rotate which moves the locking pawl 40 into engagement with lock teeth 40a, see FIG. 2. The spool and ratchet assembly 50 is of standard construction, the details of which are described in U.S. Pat. No. 4,564,154 which is incorporated herein by reference. Spring arbor 56 is received within rewind spring 100 protected by a spring cassette 102 in a known manner. A cover 70 protects mechanisms 30, 50, and 40 which are mounted to side 16. Cover 70 is also referred to as a mechanism cover. Retractor 10, in particular the spool and ratchet assembly 50 further includes a spool 90 shown in FIG. 2 having a center 92 and opposing flanges 94 and 96. Center 92 is generally hollow and includes rectangular opening 98, see FIG. 1, into which the generally rectangular shaft 52, see FIG. 4, extends through. The quantity of seat belt webbing is secured to the shaft 52 which extends through a conventional slot, not shown, in the spool in a known manner and is of sufficient length to be positioned about an occupant.

Cover 70 includes a plurality of sides 72 one of which forms a bottom 74. Each side 72 including bottom 74 terminates in a face 76 which is in general flat and when installed upon side 16 will be parallel to side 16. Face 76 includes a peripheral recessed portion 78 which extends about the face. The recessed portion 78 includes a narrow grooved portion 78a located in portions of the periphery. The recessed portion 78 also includes wider recessed portions 78b located about integrally formed fasteners on cover 70. These integrally formed fasteners may include resilient snap clips 70a each of which snap to and hold an edge portion of side 16. These fasteners may also include cylindrically formed clips 70b which are received with and snap to holes 16a formed in side 16. Portion 78b adjacent each clip 70a is somewhat rectangular and portion 78b about the clips 70b is somewhat circular. A peripheral seal 80 is positioned within the recessed portion 78. Preferably seal 80 is resilient such as being made from rubber, silicon or other comparable material. The bottom 74 includes an integral depression, hole or opening in the form of a partial cylinder 34a into which is located a permanent magnet 38 as shown in the various figures. The magnet 34 can be press fit into hole 38a or glued therein.

Figure 5:
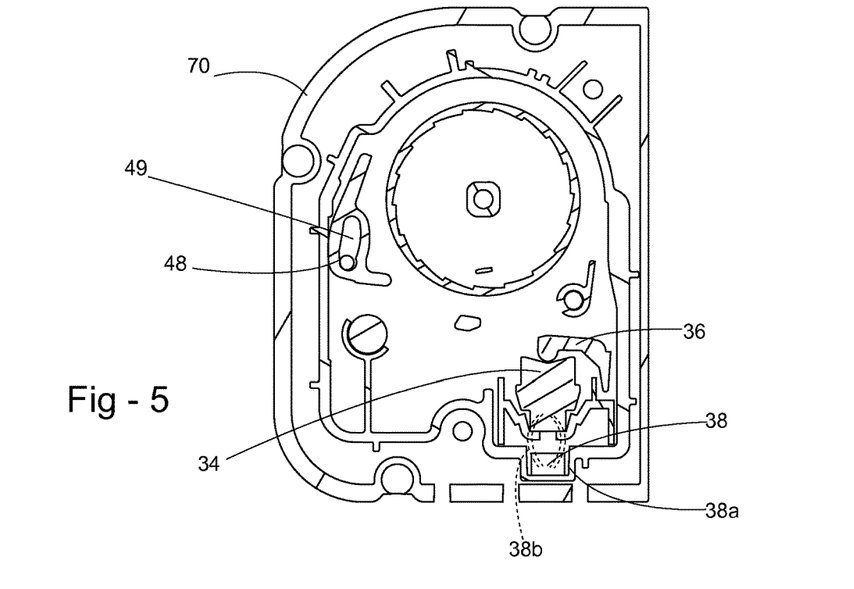
FIG. 5 is a cross-sectional view of the sensing-mechanism-side of a retractor.
Figure 5A:
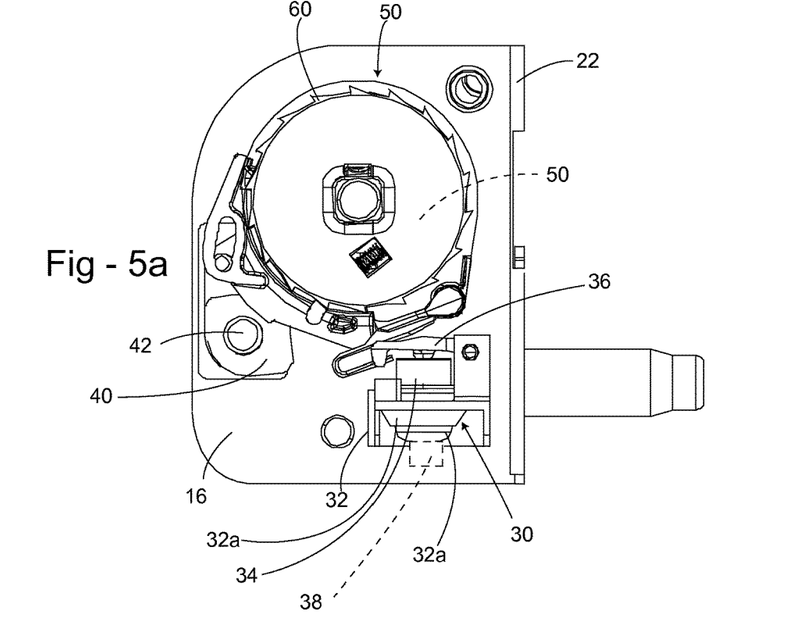
FIG. 5a is a side view of the mechanism side of the retractor with a cover removed but with a magnet shown in dotted line in its operational position.

In FIG. 3 magnet 38 is shown spaced apart from the sensor housing 32 and movable mass 34. By virtue of the magnet 38 the magnetic force or field 38b operative upon the mass 34, which is preferably magnetic or magnetic covered with a non-magnetic coating, the mass 34 will be held or biased into its housing 32 and less prone to being bounced about causing premature and unwanted lock-up of the retractor. Reference is briefly made to FIGS. 5 and 5a which show the relationship of magnet 38 to the inertial sensor. In FIG. 5 the recess 38a in bottom 74 of cover 70 is more clearly shown. In FIG. 5a the cover 70 is removed to see a plan view of the inertial sensor and spool and ratchet assembly 50 however the magnet 38 is shown in phantom line to show its operational position had the cover 70 been in place. The magnet 38 is located within recess 38a, the recess is not shown in FIG. 5a as cover 70 is not shown.

Cover 70 can be made using a 2-shot injection mold process in which the cover is molded with the peripheral recessed portion 78 and then the seal material is injected into the recessed portion 78. In an alternate embodiment the groove and seal can be replaced by a gasket which is placed upon the face rather than molded to it. The gasket can be made from a resilient or fibrous non-resilient material. The seal 80 includes narrow portions 80a corresponding to the narrow grooved portions 78a and a more flat and wider portion 80b corresponding to wider recessed portioned 78b.

The spring cover 100, while of a different shape, may also include a peripheral recessed portion 178 recessed relative to a face 176 with a narrowed grooved section or sections 178a and a wider section 178b. A seal 180 having a narrow portion 180a and wider portions 180b is received in the peripheral recessed portion 178. Spring cover 100 may also include snap clips 100a and cylindrical clips 100b as formed on cover 70. The snap clips 100a are snapped about the edges of side 14 and cylindrical clips 100b are received in openings 14a on side 14. The various peripheral seals 80 and 180 reduce or prevent the movement of contaminants such as dust or water from entering within each of the covers 70 and 100. Contamination is not a particular problem with automobiles and trucks but can be when the retractor is used on an off-the-road vehicle traversing mud and snow laden roads and trails.

Upon assembly the shaft and ratchet assembly 50 extends through openings 18 and 20. The shaft is designed to be coaxial to the centers of openings 18 and 20. Retractor 10 additionally includes a bushing 120 with a first flange 120a situated on the outer surface of side 16 and a center portion 120b situated within opening 18. Bushing 120 may also include another flanged portion 120c extending radially inward. The two flanges hold the bushing in place. Portion 120b, which is parallel to the axis of the spool, includes a circular groove 120d within which is positioned an o-ring 130 having a center opening 130a received about shaft 52 and providing seal therewith. Upon assembly o-ring 130 is inserted within groove 120d and the bushing 120 with the o-ring in place is inserted into opening 18 in side 16.

Subsequently the spool and shaft assembly is slid through the center of the o-ring 130. O-ring 130 sits upon the shaft to create a rotary seal 88 therebetween. As will be seen below the radial seal and the peripheral seal on cover 70 prevent contaminants from entering into the region of the retractor surrounding the ratchet wheel 60 and vehicle sensor 30. Additionally by virtue of the peripheral 80 the various components located between side 16 and housing 70 are secure from contamination from such sources such as mud, sand and water making retractor 10 ideal for off-road vehicles.

Figure 4A:
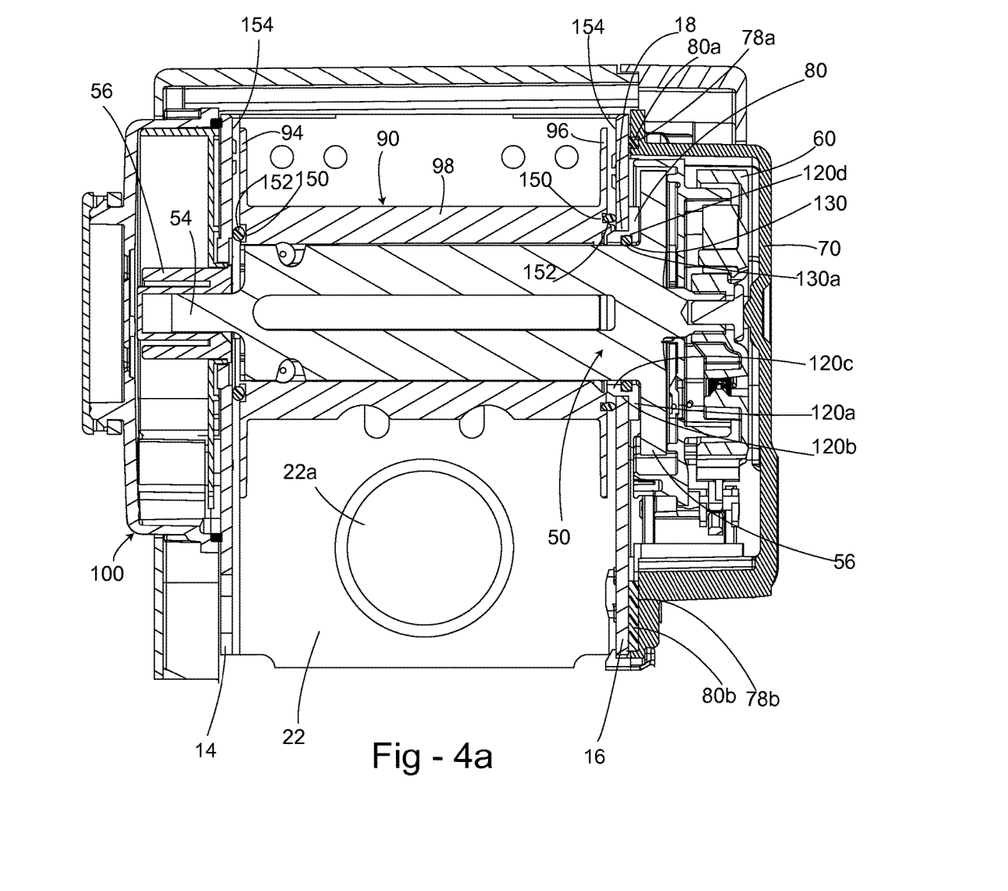
FIG. 4a shows an alternate embodiment of the invention.

The spring side of the shaft 90 can also include another bushing and o-ring such as o-ring 130 and bushing 120, this would provide additional sealing for the spring. Reference is again made to FIGS. 1 and 4 which show an annular ring 140 which is positioned near the inner portions of bushing 120. This feature wipes contaminants from the bushing 120 and aids in keeping the bushing in place. Reference is briefly made to FIG. 4a which shows an alternate embodiment of the invention. Both flanges 94 and 96 of spool 90 include an annular groove 150; an O-ring 152 is positioned with the respective groove 150. The o-ring 152 creates a rotary seal between the spool flange and a respective inside surface 154 of each side 14 and 16 of the frame.

Figure 6:
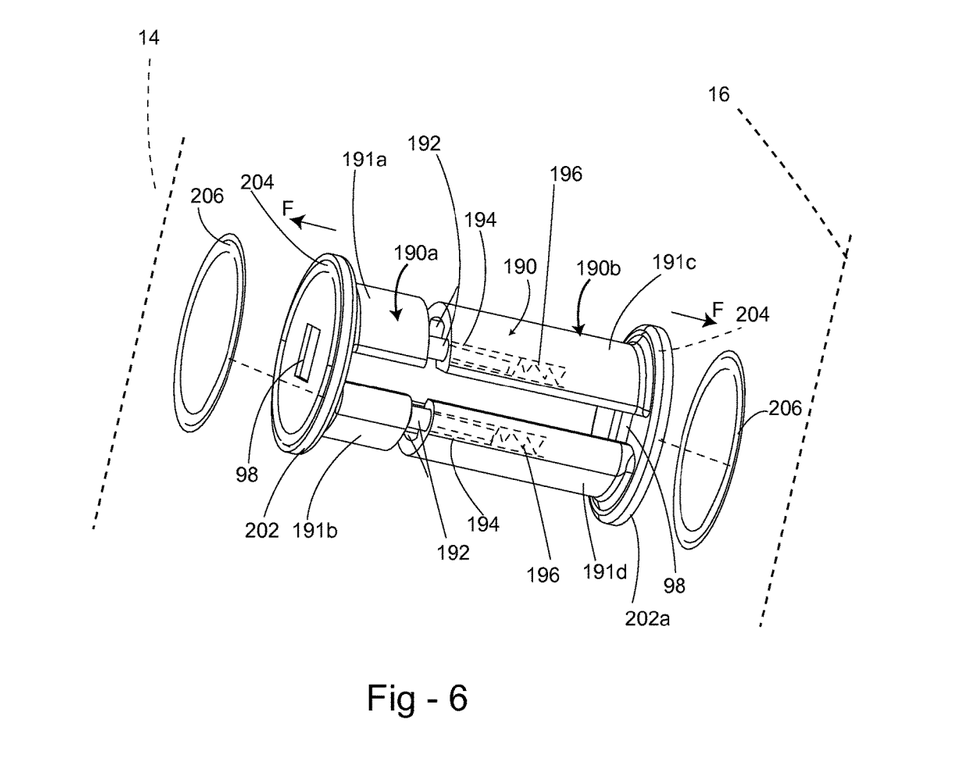
FIG. 6 shows another embodiment of the invention.

Reference is briefly made to FIG. 6 which shows another embodiment of the invention. As mentioned above the embodiment shown in FIG. 4a proposes placing o-rings 152 in the exterior surfaces of spool 90. FIG. 6 shows an alternative hollow spool 192 into which the spool and ratchet assembly 50 is inserted. As before shaft 52 is inserted within the rectangular opening is 98. In this embodiment spool 190 comprises two sections 190a and 190b each of which are relatively movable one to the other. Section 190a comprises upper and lower curved segments 191a and 191b. Similarly section 190b comprises upper and lower curved segments 191c and 191d. Each of segments 191a and 191b include a plurality of legs 192 proximate to the hollow, curved end portions of each of the segments 191a-d. Each leg 192 is received within a respective cylindrically shaped bore 194. Located at the bottom of each bore 194 is a spring 196. Each spring 196 acts upon a respective leg 192 thereby biasing sections 190a and 190b apart. The bias forces are generally shown by F. Each section 190a and 190b includes an output facing flange 202 and 202a respectively. In each respective outer face there is a circumferential groove 204 into which is received an o-ring 206 which for the purpose of illustration is shown displaced from its groove 204. As can be appreciated the spool 190 is positioned between the inner surfaces of the sides 14 and 16 of the frame. The respective springs 196 bias the o-rings 206 into the respective inner surface of each frame side. The level of bias force F can be changed by the selective choice of the strength of each spring 106.

Many changes and modifications in the above-described embodiment of the invention can, of course, be carried out without departing from the scope thereof. Accordingly, that scope is intended to be limited only by the scope of the appended claims.

Cover 70 includes a plurality of sides 72 one of which forms a bottom 74. Each side 72 including bottom 74 terminates in a face 76 which is in general flat and when installed upon side 16 will be parallel to side 16.

The invention claimed is:

1. A seat belt retractor (10) having a frame with sides (14, 16) and a cover (70) associated with at least one side, an inertia sensor (30) positioned between the at least one side of the frame and the cover (70), a seal (80) located between the cover (70) and the frame side (16) to prevent contaminants from entering a space about the inertia sensor, the inertia sensor (30) including a movable mass (34) and a magnet (38) spaced from the mass (34) to create a magnetic force upon the mass (34) preventing the movable mass (34) from moving excessively if the retractor (10) is subject to predetermined levels of vibration; wherein the cover (70) includes a plurality of sides (72) one of which forms a bottom (74), each side (72) including bottom (74) terminates in a face (76) which is in general flat and when installed upon side (16) is parallel to the side (16) and the face (76) includes a peripheral recessed portion (78) which extends about the face, the recessed portion (78) includes narrow grooved portions (78a) located in portions of the periphery and wider recessed portions (78b) located about integrally formed fasteners (70a) with cylindrically formed clips (70b) on the cover (70) and wherein the seal (80) includes narrow portions (80a) corresponding to the narrow grooved portions (78a) and a more flat and wider portion (80b) corresponding to the wider recessed portions (78b).

2. The seat belt retractor (10) of claim 1 wherein secured to one side (16) is the inertia sensor (30) which further comprises a housing (32), the movable mass (34) and a sensor pawl (36).

3. The seat belt retractor (10) of claim 2 wherein the sensor pawl (36) can comprise a single pawl or a more complex mechanism comprising multiple pawls.

4. The seat belt retractor (10) of claim 2 wherein the housing (32) includes a concave portion (32a) in which the mass (32) is located.

5. The seat belt retractor (10) of claim 1 wherein the movable mass (32) is a standing man sensor.

6. The seat belt retractor (10) of claim 1 wherein the inertia sensor (30) is part of a locking mechanism of retractor (10).

7. The seat belt retractor (10) of claim 6 wherein the locking mechanism additionally includes a locking pawl (40) which pivots about a pin (42).

8. The seat belt retractor (10) of claim 7 wherein the pin (42) is received within a small opening (44) in the side of the frame (16).

9. The seat belt retractor (10) of claim 7 wherein the pawl (40) includes a control pin (48) that is received within a slot (49) in a shaft-lock wheel and a ratchet assembly (50).

10. The seat belt retractor (10) of claim 9 wherein the locking mechanism additionally includes the shaft lock wheel and ratchet assembly (50), the assembly (50) further includes a shaft (52) which terminates in an end (54) which is received within a spring arbor (56).

11. The seat belt retractor (10) of claim 1 wherein magnet (38) spaced apart from both the sensor housing (32) and movable mass (34).

12. The seat belt retractor (10) of claim 11 wherein the magnet (38) generates the magnetic force or field (38b) operative upon the mass (34), the mass (34) being magnetic or magnetic and covered with a non-magnetic coating.

13. The seat belt retractor (10) of claim 12 wherein the mass (34) is held or biased into the housing (32) and less prone to being bounced about causing premature and unwanted lock-up of the retractor.

14. The seat belt retractor (10) of claim 1 wherein the magnet (38) is located within a recess (38a).

15. The seat belt retractor (10) of claim 1 wherein cover (70) can be made using a 2-shot injection mold process in which the cover is molded with the peripheral recessed portion (78).

16. The seat belt retractor (10) of claim 15 wherein the seal (80) is made of a seal material and injected into the recessed portion (78).

17. The seat belt retractor (10) of claim 15 wherein the seal (80) is a gasket which is placed upon the face (76), the gasket being made from a resilient or fibrous non-resilient material.

18. A seat belt retractor (10) having a frame with sides (14, 16) and a cover (70) associated with at least one side, an inertia sensor (30) positioned between the at least one side of the frame and the cover (70), a seal (80) located between the cover (70) and the frame side (16) to prevent contaminants from entering a space about the inertia sensor, the inertia sensor (30) including a movable mass (34) and a magnet (38) spaced from the mass (34) to create a magnetic force upon the mass (34) preventing the movable mass (34) from moving excessively if the retractor (10) is subject to predetermined levels of vibration, wherein the inertia sensor (30) is part of a locking mechanism of retractor (10), the locking mechanism additionally includes a locking pawl (40) which pivots about a pin (42), the pin (42) is received within a small opening (44) in the side of the frame (16), and wherein the pawl (40) includes a control pin (48) that is received within a slot (49) in a shaft-lock wheel and a ratchet assembly (50), wherein the locking mechanism additionally includes the shaft lock wheel and ratchet assembly (50), the assembly (50) further includes a shaft (52) which terminates in an end (54) which is received within a spring arbor (56), wherein the seal (80) includes narrow portions (80a) corresponding to the narrow grooved portions (78a) and a more flat and wider portion (80b) corresponding to the wider recessed portions (78b).

* * * * *